(12) United States Patent
Eckel et al.

(10) Patent No.: US 7,834,069 B2
(45) Date of Patent: Nov. 16, 2010

(54) IMPACT-RESISTANCE-MODIFIED FILLED POLYCARBONATE COMPOSITIONS

(75) Inventors: Thomas Eckel, Dormagen (DE); Achim Feldermann, Dusseldorf (DE); Burkhard Thuermer, Bornheim (DE); Vera Buchholz, Cologne (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 11/985,754

(22) Filed: Nov. 16, 2007

(65) Prior Publication Data

US 2008/0132618 A1 Jun. 5, 2008

(30) Foreign Application Priority Data

Nov. 24, 2006 (DE) .................... 10 2006 055 479

(51) Int. Cl.
*E01C 7/26* (2006.01)
*C08K 7/18* (2006.01)
*C08K 7/22* (2006.01)

(52) U.S. Cl. .................. 523/218; 523/219; 523/513; 523/522; 524/126; 524/127; 524/504

(58) Field of Classification Search ............ 524/127, 524/125, 126, 68, 130, 141, 145, 430, 437, 524/449, 451, 504; 525/67, 439; 523/218, 523/514, 521, 513, 201, 219, 522, 526; 252/601
See application file for complete search history.

(56) References Cited

U.S. PATENT DOCUMENTS

| 4,243,575 | A | | 1/1981 | Myers et al. | |
|---|---|---|---|---|---|
| 4,268,320 | A | * | 5/1981 | Klingaman et al. | 106/467 |
| 4,692,480 | A | | 9/1987 | Takahashi et al. | 523/218 |
| 5,091,461 | A | | 2/1992 | Skochdopole | 524/493 |
| 6,506,819 | B1 | * | 1/2003 | Shukla et al. | 523/218 |
| 6,569,930 | B1 | * | 5/2003 | Eckel et al. | 524/127 |
| 6,590,015 | B1 | * | 7/2003 | Eckel et al. | 524/127 |
| 6,617,364 | B2 | * | 9/2003 | Soane et al. | 521/56 |
| 6,914,090 | B2 | * | 7/2005 | Seidel et al. | 524/127 |
| 6,969,745 | B1 | * | 11/2005 | Taraiya et al. | 525/439 |
| 7,455,798 | B2 | * | 11/2008 | Datta et al. | 264/43 |
| 2007/0060678 | A1 | * | 3/2007 | Wenz et al. | 524/115 |

FOREIGN PATENT DOCUMENTS

| GB | 1 585 327 | 2/1981 |
|---|---|---|
| JP | 1-104637 | 4/1989 |
| JP | 6-345953 | 12/1994 |
| JP | 2001-072853 | 3/2001 |

OTHER PUBLICATIONS

"Cenosphere." Grand Resources Co., ltd. 2003, pp. 1-2.*
"Cenosphere." Grand Resources Co., ltd. 2003, pp. 1-2.*
International Search Report for PCT/EP2007/009742.

* cited by examiner

*Primary Examiner*—Vasu Jagannathan
*Assistant Examiner*—Hannah Pak
(74) *Attorney, Agent, or Firm*—Baker Donelson Bearman, Caldwell & Berkowitz, PC

(57) ABSTRACT

A thermoplastic molding composition that features good mechanical properties as well as processability is disclosed. The composition that contains aromatic polycarbonate and/or aromatic polyester carbonate, rubber-modified graft polymer and a plurality of hollow ceramic beads is suitable for making molded articles characterized by good ESC behavior and flammability rating.

9 Claims, No Drawings

IMPACT-RESISTANCE-MODIFIED FILLED POLYCARBONATE COMPOSITIONS

FIELD OF THE INVENTION

The invention is directed to thermoplastic molding compositions and more particularly to compositions that contain a carbonate polymer.

TECHNICAL BACKGROUND OF THE INVENTION

In EP-A198 648 thermoplastic molding compositions are disclosed that contain a spherical hollow filler with a particle size less than 500 μm. The filler has a ratio of external diameter to wall thickness of 2.5-10 and results in an increase in the stiffness and strength at low weight. The scratch resistance or flowability of such molding compositions is not described.

EP-A391413 describes the use of talc as filler in impact-resistance-modified polycarbonate. No influence on the scratch resistance or on the shrinkage due to processing is described.

Highly scratch-resistant molding compositions are known. For example, molding compositions consisting of a thermoplastic material and solid glass beads are disclosed in DE-A2721887. Films made of this material have a good light transmission and scratch resistance. No account is given of the flowability, stiffness or shrinkage due to processing of these molding compositions.

JP-A01-104637 describes mixtures consisting of crystalline polypropylene and modified polypropylene, to which hollow particles consisting of $Al_2O_3$—$SiO_2$ have been added. In comparison with a corresponding mixture with talc, an improved scratch resistance with diminished flexural modulus was obtained by virtue of these particles.

SUMMARY OF THE INVENTION

A thermoplastic molding composition that features good mechanical properties as well as processability is disclosed. The composition that contains
aromatic polycarbonate and/or aromatic polyester carbonate, rubber-modified graft polymer and
a plurality of hollow ceramic beads is suitable for making molded articles characterized by good ESC behavior and flammability rating.

DETAILED DESCRIPTION OF THE INVENTION

The object of the present invention is the provision of a molding composition that is distinguished by a high flowability (measured as MVR) and by a good resistance to chemicals (ESC behavior), with unchanged high scratch resistance. In a preferred embodiment the molding compositions are flame-resistant and satisfy the requirements UL94 with V-0 also in the case of thin wall thicknesses (i.e. wall thickness of 1.5 mm).

Surprisingly, it has been found that compositions containing
A) 10-90 parts by weight, preferably 50-85 parts by weight, of aromatic polycarbonate and/or aromatic polyester carbonate,
B) 0.5-30 parts by weight, preferably 1-25 parts by weight, particularly preferably 2-20 parts by weight, of rubber-modified graft polymer,
C) 0.1-50 parts by weight, preferably 0.3-30 parts by weight, particularly preferably 0.5-20 parts by weight, of hollow ceramic beads, and optionally
D) preferably 0-20 parts by weight, more preferably 1-18 parts by weight, particularly preferably 2-16 parts by weight, of phosphorus-containing flameproofing agent, and optionally
E) preferably 0-40 parts by weight, more preferably 1-30 parts by weight, of vinyl(co)polymer (E.1) and/or polyalkylene terephthalate (E.2), and optionally
F) preferably 0-10 parts by weight, more preferably 0.5-5 parts by weight, of conventional functional additives, the sum of the parts by weight of all the components (A+B+C+D+E+F) equals 100.

Component A

Aromatic polycarbonates and/or aromatic polyester carbonates suitable in accordance with the invention according to component A are known from the literature or capable of being produced by processes known from the literature (on the production of aromatic polycarbonates, see, for example, Schnell, "Chemistry and Physics of Polycarbonates", Interscience Publishers, 1964 and also DE-AS 1 495 626, DE-A 2 232 877, DE-A 2 703 376, DE-A 2 714 544, DE-A 3 000 610, DE-A 3 832 396; on the production of aromatic polyester carbonates, see, for example, DE-A 3 007 934).

The production of aromatic polycarbonates is undertaken, for example, by conversion of aromatic dihydroxy compounds (herein referred to as diphenols) with carbonic acid halides, preferably phosgene, and/or with aromatic dicarboxylic acid dihalides, preferably benzenedicarboxylic acid dihalides, in accordance with the phase-boundary process, optionally using chain terminators, for example monophenols, and optionally using multifunctional compounds (compounds having functionalities of three or more) as branching agents, for example triphenols or tetraphenols. Similarly, production is possible via a melt-polymerization process by conversion of diphenols with diphenyl carbonate, for example.

Diphenols for producing the aromatic polycarbonates and/or aromatic polyester carbonates are preferably those of the formula (I)

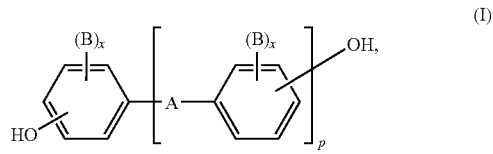

wherein
A is a single bond, $C_1$ to $C_5$ alkylene, $C_2$ to $C_5$ alkylidene, $C_5$ to $C_6$ cycloalkylidene, —O—, —SO—, —CO—, —S—, —$SO_2$—, $C_6$ to $C_{12}$ arylene, onto which further aromatic rings, optionally containing heteroatoms, may have been condensed, or a residue of the formula (II) or (III)

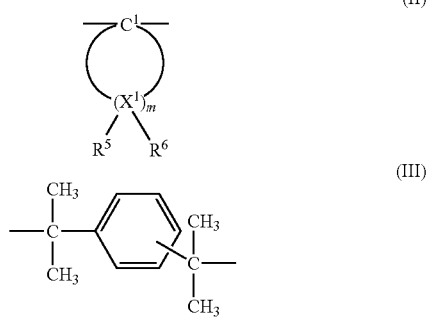

B is, in each instance, $C_1$ to $C_{12}$ alkyl, preferentially methyl, halogen, preferentially chlorine and/or bromine, x are, in each instance, independently of one another, 0, 1 or 2, p is 1 or 0, and $R^5$ and $R^6$ are individually selectable for each $X^1$ and are, independently of one another, hydrogen or $C_1$ to $C_6$ alkyl, preferably hydrogen, methyl or ethyl, $X^1$ is carbon and m signifies an integer from 4 to 7, preferably 4 or 5, with the proviso that, on at least one atom $X^1$, $R^5$ and $R^6$ are simultaneously alkyl.

Preferred diphenols are hydroquinone, resorcinol, dihydroxydiphenols, bis(hydroxyphenyl)-$C_1$-$C_3$-alkanes, bis(hydroxyphenyl)-$C_5$-$C_6$-cycloalkanes, bis(hydroxyphenyl) ethers, bis(hydroxyphenyl)sulfoxides, bis(hydroxyphenyl) ketones, bis(hydroxyphenyl)sulfones and α,α-bis (hydroxyphenyl)diisopropylbenzenes and also the ring-brominated and/or ring-chlorinated derivatives thereof.

Particularly preferred diphenols are 4,4'-dihydroxydiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenylsulfide, 4,4'-dihydroxydiphenylsulfone and also the dibrominated and tetrabrominated or chlorinated derivatives thereof, such as, for example, 2,2-bis(3-chloro-4-hydroxyphenyl)propane, 2,2-bis(3,5-dichloro-4-hydroxyphenyl) propane or 2,2-bis(3,5-dibromo-4-hydroxyphenyl)propane. Particularly preferred is 2,2-bis(4-hydroxyphenyl)propane (bisphenol A). The diphenols may be employed individually or in the form of mixtures. The diphenols are known from the literature or may be obtained by processes known from the literature.

Suitable chain terminators for the production of the thermoplastic aromatic polycarbonates are, for example, phenol, p-chlorophenol, p-tert.-butylphenol or 2,4,6-tribromophenol, but also long-chain alkylphenols, such as 4-[2-(2,4,4-trimethylpentyl)]phenol, 4-(1,3-tetramethylbutyl)phenol according to DE-A 2 842 005 or monoalkylphenol or dialkylphenols with a total of 8 to 20 C atoms in the alkyl substituents, such as 3,5-di-tert.-butylphenol, p-iso-octylphenol, p-tert.-octylphenol, p-dodecylphenol and 2-(3,5-dimethylheptyl)phenol and 4-(3,5-dimethylheptyl)phenol. The quantity of chain terminators to be employed amounts generally to between 0.5 mol % and 10 mol %, relative to the molar sum of the diphenols employed in the given case.

The thermoplastic aromatic polycarbonates have weight-average molecular weights ($M_w$, measured, for example, by GPC, ultracentrifuge or scattered-light measurement) of 10,000 to 200,000 g/mol, preferably 15,000 to 80,000 g/mol, particularly preferably 24,000 to 32,000 g/mol.

The thermoplastic aromatic polycarbonates may be branched in a known manner, preferably through the incorporation of 0.05 mol % to 2.0 mol %, relative to the sum of the diphenols employed, of compounds having functionalities of three or more, for example those with three and more phenolic groups.

Suitable are both homopolycarbonates and copolycarbonates. For the purpose of producing copolycarbonates according to the invention according to component A, 1 wt. % to 25 wt. %, preferentially 2.5 wt. % to 25 wt. %, relative to the total quantity of diphenols to be employed, polydiorganosiloxanes with hydroxyaryloxy terminal groups may also be employed. These are known (U.S. Pat. No. 3,419,634) and capable of being produced by processes known from the literature. Also suitable are copolycarbonates containing polydiorganosiloxane; the production of copolycarbonates containing polydiorganosiloxane is for example described in DE-A 3 334 782.

Preferred polycarbonates are, in addition to the bisphenol-A homopolycarbonates, the copolycarbonates of bisphenol A with up to 15 mol %, relative to the molar sums in respect of diphenols, of diphenols other than those named as being preferred or particularly preferred, in particular 2,2-bis (3,5-dibromo-4-hydroxyphenyl)propane.

Aromatic dicarboxylic acid dihalides for producing aromatic polyester carbonates are preferably the di-acid dichlorides of isophthalic acid, of terephthalic acid, of diphenyl ether 4,4'-dicarboxylic acid and of naphthalene-2,6-dicarboxylic acid.

Particularly preferred are mixtures of the di-acid dichlorides of isophthalic acid and of terephthalic acid in a ratio between 1:20 and 20:1.

In the course of the production of polyester carbonates, in addition a carbonic acid halide, preferably phosgene, is used concomitantly as bifunctional acid derivative.

By way of chain terminator for the production of the aromatic polyester carbonates, besides the monophenols already mentioned, the chlorocarbonic esters thereof and acid chlorides of aromatic monocarboxylic acids, optionally substituted by $C_1$ to $C_{22}$ alkyl groups or by halogen atoms, and also aliphatic $C_2$ to $C_{22}$ monocarboxylic acid chlorides, are also suitable.

The quantity of chain terminators is 0.1 mol % to 10 mol %, relative to the moles of diphenol, and, in the case of monocarboxylic-acid-chloride chain terminators, to moles of dicarboxylic acid dichloride.

In the course of the production of aromatic polyester carbonates in addition one or more aromatic hydroxycarboxylic acid may be used.

The aromatic polyester carbonates may be both linear and branched in known manner (see DE-A 2 940 024 and DE-A 3 007 934).

By way of branching agent, use may be made, for example, of trifunctional or polyfunctional carboxylic acid chlorides, such as trimesic acid trichloride, cyanuric acid trichloride, 3,3'-4,4'-benzophenone tetracarboxylic acid tetrachloride, 1,4,5,8-naphthalenetetracarboxylic acid tetrachloride or pyromellitic acid tetrachloride, in quantities from 0.01 mol % to 1.0 mol % (relative to dicarboxylic acid dichlorides employed) or trifunctional or polyfunctional phenols, such as phloroglucinol, 4,6-dimethyl-2,4,6-tri(4-hydroxyphenyl) hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5-methylbenzyl)-4-methylphenol, 2-(4-hydroxyphenyl)-2-(2,4-dihydroxytriphenyl) propane, tetra(4-[4-hydroxyphenylisopropyl]phenoxy) methane, 1,4-bis[4,4'-dihydroxytriphenyl)methyl]benzene, in quantities from 0.01 mol % to 1.0 mol %, relative to diphenols employed. Phenolic branching agents may be charged together with the diphenols; acid-chloride branching agents may be charged together with the acid dichlorides.

In the thermoplastic aromatic polyester carbonates the proportion of carbonate structural units may vary arbitrarily. The proportion of carbonate groups preferably amounts to up to, but excluding 100 mol %, in particular up to 80 mol %, particularly preferably up to 50 mol %, relative to the sum of ester groups and carbonate groups. Both the ester portion and the carbonate portion of the aromatic polyester carbonates may be present in the polycondensate in the form of blocks or in randomly distributed manner.

The relative solution viscosity ($\eta_{rel}$) of the aromatic polycarbonates and polyester carbonates is within the range 1.18 to 1.4, preferably 1.20 to 1.32 (measured in respect to solutions of 0.5 g polycarbonate or polyester carbonate in 100 ml methylene-chloride solution at 25° C.).

Component B

Component B comprises one or more graft polymers of

B.1 5 wt. % to 95 wt. %, preferably 30 wt. % to 90 wt. %, of at least one vinyl monomer on B.2 95 wt. % to 5 wt. %, preferably 70 wt. % to 10 wt. %, of one or more graft bases with glass transition temperatures <10° C., preferably <0° C., particularly preferably <−20° C.

The graft base B.2 generally has a mean particle size ($d_{50}$ value) of 0.05 µm to 10 µm, preferably 0.1 µm to 5 µm, particularly preferably 0.2 µm to 1 µm.

Monomers B.1 are preferably mixtures of

B.1.1 50 parts by weight to 99 parts by weight of vinyl aromatics and/or ring-substituted vinyl aromatics (such as styrene, α-methylstyrene, p-methylstyrene, p-chlorostyrene) and/or $C_1$-$C_8$ alkyl(meth)acrylates, such as methyl methacrylate, ethyl methacrylate, and B.1.2 1 part by weight to 50 parts by weight of vinyl cyanides (unsaturated nitriles such as acrylonitrile and methacrylonitrile) and/or $C_1$-$C_8$ alkyl (meth)acrylates, such as methyl methacrylate, n-butyl acrylate, t-butyl acrylate, and/or derivatives (such as anhydrides and imides) of unsaturated carboxylic acids, for example maleic anhydride and N-phenyl maleimide.

Preferred monomers B.1.1 are at least one member selected from among the monomers styrene, α-methylstyrene and methyl methacrylate; preferred monomers B.1.2 are at least one member selected from among the monomers acrylonitrile, maleic anhydride and methyl methacrylate. Particularly preferred monomers are B.1.1 styrene and B.1.2 acrylonitrile.

Suitable graft bases B.2 are, for example, diene rubbers, EP(D)M rubbers, i.e. those based on ethylene/propylene and optionally diene, acrylate rubbers, polyurethane rubbers, silicone rubbers, chloroprene and ethylene/vinyl-acetate rubbers.

Preferred graft bases B.2 are diene rubbers, for example based on butadiene and isoprene, or mixtures of diene rubbers or copolymers of diene rubbers or mixtures thereof with further copolymerizable monomers (e.g. according to B.1.1 and B.1.2), with the proviso that the glass transition temperature of component B.2 lies below <10° C., preferably <0° C., particularly preferably <−10° C. Pure polybutadiene rubber is particularly preferred.

Particularly preferred polymers B are, for example, ABS polymers (emulsion ABS, bulk ABS and suspension ABS), such as are described, for example, in DE-OS 2 035 390 (=U.S. Pat. No. 3,644,574) or in DE-OS 2 248 242 (=GB-PS 1 409 275) or in *Ullmanns Enzyklopädie der Technischen Chemie, Vol.* 19 (1980), p 280 ff. The gel proportion of graft base B.2 amounts to at least 30 wt. %, preferably at least 40 wt. % (measured in toluene).

The graft copolymers B are produced by radical polymerization, for example by emulsion polymerization, suspension polymerization, solution polymerization or bulk polymerization, preferably by emulsion polymerization or bulk polymerization.

Particularly preferred graft rubbers are ABS polymers produced by emulsion-polymerization process by redox initiation with an initiator system consisting of organic hydroperoxide and ascorbic acid in accordance with U.S. Pat. No. 4,937,285.

Since in the course of the graft reaction the graft monomers are known to be not necessarily completely grafted onto the graft base, in accordance with the invention the expression 'graft polymers B' is understood to include in addition to the graft polymer, ungrafted (co)polymers of B.1 that are obtained by (co)polymerization of the graft polymers in the presence of the graft base and that accrue concomitantly in the course of processing.

Suitable acrylate rubbers according to B.2 of the polymers B are preferably polymers of alkyl acrylates, optionally with up to 40 wt. %, relative to B.2, of other polymerizable, ethylenically unsaturated monomers. The preferred polymerizable acrylic esters include $C_1$ to $C_8$ alkyl esters, for example methyl, ethyl, butyl, n-octyl and 2-ethylhexyl esters; halogen alkyl esters, preferably halogen $C_1$-$C_8$ alkyl esters, such as chloroethyl acrylate and also mixtures of these monomers.

For the purpose of crosslinking, monomers with more than one polymerizable double bond may be copolymerized. Preferred examples of crosslinking monomers are esters of unsaturated monocarboxylic acids with 3 to 8 C atoms and of unsaturated monohydric alcohols with 3 to 12 C atoms, or of saturated polyols with 2 to 40H groups and 2 to 20 C atoms, such as ethylene glycol dimethacrylate, allyl methacrylate; polyunsaturated heterocycliccompounds, such as trivinyl cyanurate and triallyl cyanurate; polyfunctional vinylcompounds, such as divinylbenzenes and trivinylbenzenes; but also triallyl phosphate and diallyl phthalate. Preferred crosslinking monomers are allyl methacrylate, ethylene glycol dimethacrylate, diallyl phosphate and heterocycliccompounds that exhibit at least three ethylenically unsaturated groups. Particularly preferred crosslinking monomers are the cyclic monomers triallyl cyanurate, triallyl isocyanurate, triacryloylhexahydro-s-triazine, triallylbenzenes. The quantity of the crosslinked monomers preferably amounts to 0.02 wt. % to 5 wt. %, in particular 0.05 wt. % to 2 wt. %, relative to the graft base B.2. In the case of cyclic crosslinking monomers with at least three ethylenically unsaturated groups, it is advantageous to restrict the quantity to below 1 wt. % of the graft base B.2.

Preferred "other" polymerizable, ethylenically unsaturated monomers that, in addition to the acrylic esters, may optionally serve for producing the graft base B.2 are, for example, acrylonitrile, styrene, α-methylstyrene, acrylamides, vinyl $C_1$-$C_6$ alkyl ethers, methyl methacrylate, butadiene. Preferred acrylate rubbers for graft base B.2 are emulsion polymers that exhibit a gel content of at least 60 wt. %.

Further suitable graft bases according to B.2 are silicone rubbers with graft-active sites, such as are described in DE-OS 3 704 657, DE-OS 3 704 655, DE-OS 3 651 540 and DE-OS 3 631 539.

The gel content of the graft base B.2 is determined at 25° C. in a suitable solvent (M. Hoffmann, H. Krömer, R. Kuhn, *Polymeranalytik I und II*, Georg Thieme-Verlag, Stuttgart 1977).

The mean particle size $d_{50}$ is that diameter, above and below which in each instance 50 wt. % of the particles lie. It may be determined by means of ultracentrifuge measurement (W. Scholtan, H. Lange, *Kolloid-Z. und Z. f. Polymere*, 250 (1972), 782-796).

Component C

The molding compositions according to the invention contain as component C hollow ceramic beads, preferably hollow silicon-aluminium ceramic beads. Preferred hollow ceramic beads have $Al_2O_3$ content of 15 wt. % to 45 wt. %, preferably from 20 wt. % to 35 wt. %.

In a preferred embodiment, the hollow ceramic beads have a density of 2-3 $g/cm^3$, preferably 2.2-2.6 $g/cm^3$. Particularly preferred hollow ceramic beads have a compressive strength of 50-700 MPa, preferably 200-500 MPa. The compressive strength is the isostatic pressure under which at least 80% of the beads remain undamaged.

The preferred mean particle size ($d_{50}$) of the hollow ceramic beads is 0.5-100 μm, more preferably 1-50 μm, particularly preferably 5-30 μm.

The hollow ceramic beads may be surface-treated—for example, silanised—for better compatibility with the polymer matrix in which they are incorporated.

Component D

The phosphorus-containing flameproofing agent (D) according to the invention is preferably one or more members selected from among monomeric and oligomeric phosphoric and phosphonic esters, phosphonate amines and phosphazenes. Other halogen-free phosphorus compositions, not mentioned especially here, may also be employed on their own or in arbitrary combination with other halogen-free phosphorus compositions.

Preferred monomeric and oligomeric phosphoric and phosphonic esters are phosphorus compositions of the general formula (IV)

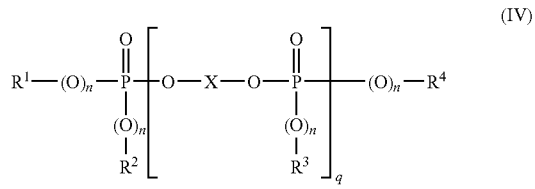

(IV)

wherein $R^1$, $R^2$, $R^3$ and $R^4$ signify in each instance, independently of one another, optionally halogenated $C_1$ to $C_8$ alkyl, or $C_5$ to $C_6$ cycloalkyl, $C_6$ to $C_{20}$ aryl or $C_7$ to $C_{12}$ aralkyl, in each instance optionally substituted by alkyl, preferably $C_1$ to $C_4$ alkyl, and/or halogen, preferably chlorine, bromine, n signify, independently of one another, 0 or 1, q signifies 0 to 30 and X signifies a mononuclear or polynuclear aromatic residue with 6 to 30 C atoms, or a linear or branched aliphatic residue with 2 to 30 C atoms, which may have been OH-substituted and may include up to 8 ether bonds.

$R^1$, $R^2$, $R^3$ and $R^4$ preferably stand, independently of one another, for $C_1$ to $C_4$ alkyl, phenyl, naphthyl or phenyl-$C_1$-$C_4$-alkyl. The aromatic groups $R^1$, $R^2$, $R^3$ and $R^4$ may, in turn, have been substituted with halogen groups and/or alkyl groups, preferably chlorine, bromine and/or $C_1$ to $C_4$ alkyl. Particularly preferred aryl residues are cresyl, phenyl, xylenyl, propylphenyl or butylphenyl, as well as the corresponding brominated and chlorinated derivatives thereof.

X in formula (IV) preferably signifies a mononuclear or polynuclear aromatic residue with 6 to 30 C atoms. Said residue is preferably derived from diphenols of the formula (I).

n in formula (IV) may be, independently of one another, 0 or 1; n is preferably equal to 1.

q stands for values from 0 to 30, preferably 0.3 to 20, particularly preferably 0.5 to 10, in particular 0.5 to 6, quite particularly preferably 1.1 to 1.6.

X stands in particularly preferred manner for

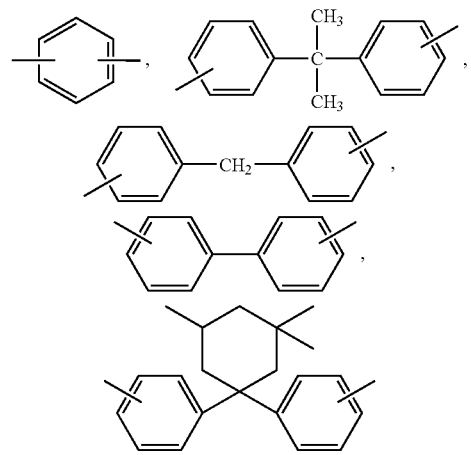

or the chlorinated or brominated derivatives thereof; in particular, X is derived from resorcinol, hydroquinone, bisphenol A or diphenylphenol. In particularly preferred manner X is derived from bisphenol A.

Mixtures of various phosphates may also be employed as component D.

Phosphorus compounds of the formula (IV) are, in particular, tributyl phosphate, triphenyl phosphate, tricresyl phosphate, diphenylcresyl phosphate, diphenyloctyl phosphate, diphenyl-2-ethylcresyl phosphate, tri(isopropylphenyl)phosphate, resorcinol-bridged oligophosphate and bisphenol-A-bridged oligophosphate. The use of oligomeric phosphoric esters of the formula (IV) that are derived from bisphenol A is particularly preferred.

Most preferred as component D is Bisphenol-A-based oligophosphate according to formula (IVa).

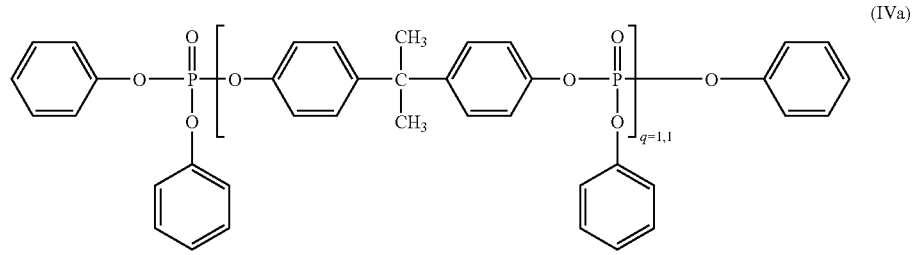

(IVa)

The phosphorus compounds suitable as component D are known (cf., for example, EP-A 0 363 608, EP-A 0 640 655) or may be produced in analogous manner by known methods (e.g. *Ullmanns Enzyklopädie der technischen Chemie*, Vol. 18, p 301 ff. 1979; Houben-Weyl, *Methoden der organischen Chemie*, Vol. 12/1, p 43; *Beilstein*, Vol. 6, p 177).

In case of mixtures of various phosphorus compounds and in case of oligomeric phosphorus compounds are employed, the q-value means stands for "mean q-value". The mean q-value may be determined by the composition of the phosphorous compound (molecular-weight distribution) being determined by means of suitable methods (gas chromatography (GC), high-pressure liquid chromatography (HPLC), gel permeation chromatography (GPC)), and by the mean values of q being calculated therefrom.

Furthermore, phosphonate amines and phosphazenes, such as are described in WO 00/00541 and WO 01/18105, may be employed as flameproofing agents.

The flameproofing agents may be employed on their own or in any mixture with one another or in a mixture with other flameproofing agents.

Component E

Component E comprises one or more thermoplastic vinyl (co)polymers E.1 and/or polyalkylene terephthalates E.2.

Suitable as vinyl(co)polymers E.1 are polymers of at least one monomer selected from among vinyl aromatics, vinyl cyanides (unsaturated nitriles), $C_1$-$C_8$ alkyl (meth)acrylates, unsaturated carboxylic acids and also derivatives (such as anhydrides and imides) of unsaturated carboxylic acids. Particularly suitable are (co)polymers formed from E.1.1 50 parts by weight to 99 parts by weight, preferably 60 parts by weight to 80 parts by weight, of vinyl aromatics and/or ring-substituted vinyl aromatics such as styrene, α-methylstyrene, p-methylstyrene, p-chlorostyrene and/or $C_1$-$C_8$ alkyl(meth)acrylates such as methyl methacrylate, ethyl methacrylate, and E.1.2 1 part by weight to 50 parts by weight, preferably 20 parts by weight to 40 parts by weight, of vinyl cyanides (unsaturated nitriles) such as acrylonitrile and methacrylonitrile and/or $C_1$-$C_8$ alkyl(meth)acrylates, such as methyl methacrylate, n-butyl acrylate, t-butyl acrylate, and/or unsaturated carboxylic acids, such as maleic acid, and/or derivatives, such as anhydrides and imides, of unsaturated carboxylic acids, for example maleic anhydride and N-phenyl maleimide.

The vinyl(co)polymers E.1 are resinous, thermoplastic and rubber-free. In particularly preferred manner the copolymer is formed from E.1.1 styrene and E.1.2 acrylonitrile.

The (co)polymers according to E.1 are known and may be produced by radical polymerization, in particular by emulsion polymerization, suspension polymerization, solution polymerization or bulk polymerization. The (co)polymers preferably have molecular weights $M_w$ (weight average, ascertained by scattering of light or by sedimentation) between 15,000 and 200,000.

The polyethylene terephthalates of component E.2 are reaction products formed from aromatic dicarboxylic acids or their reactive derivatives, such as dimethyl esters or anhydrides, and aliphatic, cycloaliphatic or araliphatic diols, as well as mixtures of these reaction products.

Preferred polyalkylene terephthalates include at least 80 wt. %, preferably at least 90 wt. %, relative to the dicarboxylic-acid component, terephthalic-acid residues and at least 80 wt. %, preferably at least 90 mol %, relative to the diol component, ethylene-glycol residues and/or butanediol-1,4 residues.

The preferred polyalkylene terephthalates may include, in addition to terephthalic-acid residues, up to 20 mol %, preferably up to 10 mol %, residues of other aromatic or cycloaliphatic dicarboxylic acids with 8 to 14 C atoms, or of aliphatic dicarboxylic acids with 4 to 12 C atoms, such as, for example, residues of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates may include, in addition to ethylene-glycol residues or butanediol-1,4 residues, up to 20 mol %, preferably up to 10 mol %, other aliphatic diols with 3 to 12 C atoms or cycloaliphatic diols with 6 to 21 C atoms, for example residues of propanediol-1,3, 2-ethylpropanediol-1,3, neopentyl glycol, pentanediol-1,5, hexanediol-1,6, cyclohexanedimethanol-1,4, 3-ethylpentanediol-2,4, 2-methylpentanediol-2,4, 2,2,4-trimethylpentanediol-1,3, 2-ethylhexanediol-1,3, 2,2-diethylpropanediol-1,3, hexanediol-2,5, 1,4-di(β-hydroxyethoxy)benzene, 2,2-bis(4-hydroxycyclohexyl)propane, 2,4-dihydroxy-1,1,3,3-tetramethylcyclobutane, 2,2-bis(4-β-hydroxyethoxyphenyl)propane and 2,2-bis(4-hydroxypropoxyphenyl)propane (DE-A-2 407 674, 2 407 776, 2 715 932).

The polyalkylene terephthalates may be branched by incorporation of relatively small quantities of trihydric or tetrahydric alcohols or of tribasic or tetrabasic carboxylic acids, for example according to DE-A 1 900 270 and U.S. Pat. No. 3,692,744. Examples of preferred branching agents are trimesic acid, trimellitic acid, trimethylolethane, trimethylolpropane and pentaerythritol.

Particularly preferred are polyalkylene terephthalates that have been produced solely from terephthalic acid and the reactive derivatives thereof (e.g. the dialkyl esters thereof) and ethylene glycol and/or butanediol-1,4, and mixtures of these polyalkylene terephthalates.

Mixtures of polyalkylene terephthalates contain 1 wt. % to 50 wt. %, preferably 1 wt. % to 30 wt. %, polyalkylene terephthalate and 50 wt. % to 99 wt. %, preferably 70 wt. % to 99 wt. %, polybutylene terephthalate.

The polyalkylene terephthalates that are preferably used generally have an intrinsic viscosity from 0.4 dl/g to 1.5 dl/g, preferably 0.5 dl/g to 1.2 dl/g, measured in phenol/o-dichlorobenzene (1:1 parts by weight) at 25° C. in an Ubbelohde viscometer.

The polyalkylene terephthalates may be produced by known methods (see, for example, *Kunststoff-Handbuch*, Volume VIII, p 695 ff., Carl-Hanser-Verlag, Munich 1973).

Further Added Substances F

The composition may contain further conventional polymer additives such as flame-retardant synergists, anti-dripping agents (for example, compounds of the substance classes comprising the fluorinated polyolefins, the silicones and also aramide fibres), lubricants and mold-release agents (for example, pentaerythritol tetrastearate), nucleating agents, stabilisers, antistatic agents (for example, conductive carbon blacks, carbon fibres, metal fibres, carbon nanotubes and also organic antistatic agents such as polyalkylene ethers, alkyl sulfonates or polyamide-containing polymers) and also dyestuffs and pigments.

Production of the Molding Compositions and Molded Articles

The thermoplastic molding compositions according to the invention are produced by mixing the respective constituents in a known manner and melt-compounding and melt-extruding at temperatures of 200° C. to 300° C. in conventional units such as internal kneaders, extruders and double-shafted screws.

The mixing of the individual constituents may be undertaken in known manner both successively and simultaneously, at approximately 20° C. (room temperature) or at a higher temperature.

The invention also provides processes for producing the molding compositions, and the use of the molding compositions for the purpose of producing molded articles.

The molding compositions according to the invention may be used for the purpose of producing molded articles of any type. These may be produced by injection molding, extrusion and blow-molding processes. A further form of processing is the production of molded articles by thermoforming from previously produced sheets or films.

Examples of such molded articles are films, profiled sections, housing parts of any type, for example for household appliances such as juicers, coffee machines, mixers; for office machines such as monitors, flatscreens, notebooks, printers, copiers; panels, pipes, electrical-installation conduits, windows, doors and other profiled sections for the construction industry (interior finishing and external applications) and also electrical and electronic components such as switches, plugs and sockets and also bodywork components or interior components for utility vehicles, in particular for the automobile field.

In particular, the molding compositions according to the invention may, for example, also be used for the purpose of producing the following molded articles or moldings: interior-finishing components for rail vehicles, ships, aircraft, buses and other motor vehicles, housings of electrical appliances containing small transformers, housings for devices for the processing and communication of information, housings and jacketing of medical instruments, massage equipment and housings for such equipment, toy vehicles for children, planar wall elements, housings for safety devices, thermally insulated shipping containers, moldings for sanitary equipment and bath equipment, covering gratings for ventilator openings and housings for gardening implements.

The following Examples serve for further elucidation of the invention.

EXAMPLES

Component A1

Linear polycarbonate based on bisphenol A with a weight-averaged molecular weight $M_w$ of 27,500 g/mol (determined by GPC).

Component A2

Linear polycarbonate based on bisphenol A with a weight-averaged molecular weight $M_w$ of 25,000 g/mol (determined by GPC).

Component B1

ABS polymer, produced by emulsion polymerization of 43 wt. % (relative to the ABS polymer) of a mixture consisting of 27 wt. % acrylonitrile and 73 wt. % styrene in the presence of 57 wt. % (relative to the ABS polymer) of a crosslinked polybutadiene rubber in particulate form (mean particle diameter $d_{50}$=0.35 μm).

Component C1

Hollow ceramic beads consisting of silicon-aluminium ceramic having $Al_2O_3$ content of 24.6 wt. %, density of 2.5 g/cm$^3$ and isostatic compressive strength of 420 MPa. The mean particle diameter of the beads was 4 μm.

Component C2

Solid glass beads Vitrolite 20 manufactured by VitroCo Enterprises (Irvine, Calif., USA). This filler consists of amorphous silicates and alumosilicates of sodium, potassium, calcium, magnesium and iron and has a mean diameter of 12 μm.

Component C3

Talc, Luzenac® A3 C manufactured by Luzenac Naintsch Mineralwerke GmbH with an MgO content of 32 wt. %, an $SiO_2$ content of 61 wt. % and an $Al_2O_3$ content of 0.3 wt. %.

Component D

Bisphenol-A-based oligophosphate (Reofoss BAPP) conforming to

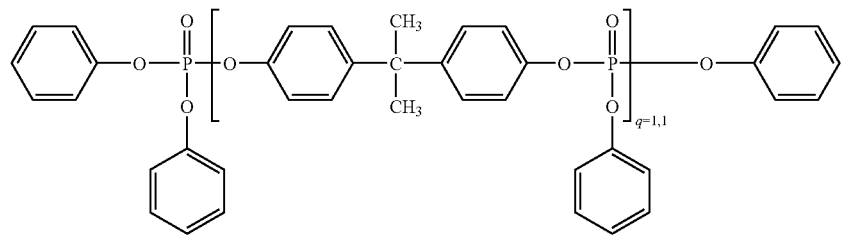

Component E1

Copolymer formed from 77 wt. % styrene and 23 wt. % acrylonitrile having a weight-averaged molecular weight $M_w$ of 130 kg/mol (determined by GPC), produced in accordance with the bulk polymerization process.

Component E2

Copolymer formed from 72 wt. % styrene and 28 wt. % acrylonitrile having a weight-averaged molecular weight $M_w$ of 140 kg/mol (determined by GPC), produced in accordance with the bulk polymerization process.

Component F

F1: polytetrafluoroethylene powder, CFP 6000 N, Du Pont

F2: pentaerythritol tetrastearate; a lubricant/mold-release agent

F3: phosphite stabilizer, Irganox® B 900, Ciba Speciality Chemicals

Production and Testing of the Molding Compositions

In a twin-screw extruder (ZSK-25) (Werner und Pfleiderer) the feed materials listed in Table 1 were compounded and granulated at a rotary speed of 225 rpm and with a throughput of 20 kg/h at a machine temperature of 260° C. The finished granulates were processed in an injection-molding machine to yield the corresponding test specimens (melt temperature 240° C., Examples 3-5, and 260° C., Examples 1-2, tool temperature 80° C., flow-front velocity 240 mm/s).

For the purpose of characterizing the properties of the test specimens, the following methods were applied:

The flowability was determined in accordance with DIN EN ISO 1133 as melt volume-flow rate (MVR) and on the basis of ISO 11443 as melt viscosity.

Tear resistance was measured in accordance with DIN EN ISO 527.

The stiffness was measured as tensile modulus of elasticity in accordance with DIN EN ISO 527.

The scratch resistance was determined as pencil hardness in accordance with ASTM D-3363. In this connection, pencils of hardness 3H, 2H, H, F, HB, B, 2B and 3B (here, decreasing hardness) were conducted over the surface with defined pressure. The pencil hardness specifies the hardest pencil with which no scratch is discernible on the surface.

The flammability was measured in accordance with UL-Subj. 94V using test specimens measuring 127 mm×12.7 mm×1.5 mm.

The stress-cracking behavior (ESC behavior) was examined in respect to specimens measuring 80 mm×10 mm×4 mm. The test medium used in each instance is specified in Tables 1 and 2. The test specimens were prestrained by means of a circular-arc template (prestraining $\epsilon_x=2.4\%$) and stored in the test medium at room temperature. The stress-cracking behavior was appraised via the cracking or rupture ("RUP").

TABLE 1

Composition and properties of the molding compositions

| Composition [wt. %] | 1 | 2 (ref.) |
|---|---|---|
| A1 | 56.3 | 56.3 |
| B1 | 16.2 | 16.2 |
| C1 | 4.8 | — |
| C2 | — | 4.8 |
| E1 | 5.7 | 5.7 |
| E2 | 16.2 | 16.2 |
| F2 | 0.7 | 0.7 |
| F3 | 0.1 | 0.1 |
| MVR (260° C./5 kg) [cm³/10 min] | 13.6 | 12.6 |
| Scratch resistance | | |
| acc. to ASTM D-3363 | F | F |
| Stress-cracking resistance (ESC behavior) | | |
| rapeseed oil 2.4% | RUP 4.3 h | RUP 3.0 h |
| Tensile modulus of elasticity [N/mm] | 2316 | 2261 |

It is evident from Table 1 that the composition according to the invention (Example 1) exhibits improved ESC behavior and flowability with good scratch resistance in comparison with the comparative example (Reference Example 2).

TABLE 2

Composition and properties of the flameproofed molding compositions

| Composition [wt. %] | 3 | 4 (ref.) | 5 (ref.) |
|---|---|---|---|
| A2 | 61.2 | 61.2 | 61.2 |
| B1 | 8.6 | 8.6 | 8.6 |
| C1 | 4.8 | — | — |
| C2 | — | 4.8 | — |
| C3 | — | — | 4.8 |
| D | 14.4 | 14.4 | 14.4 |
| E1 | 10.0 | 10.0 | 10.0 |
| F1 | 0.5 | 0.5 | 0.5 |
| F2 | 0.4 | 0.4 | 0.4 |
| F3 | 0.1 | 0.1 | 0.1 |

TABLE 2-continued

Composition and properties of the flameproofed molding compositions

| Composition [wt. %] | 3 | 4 (ref.) | 5 (ref.) |
|---|---|---|---|
| Melt viscosity [Pas] | | | |
| 1000 s$^{-1}$/240° C. | 208 | 217 | 209 |
| 1000 s$^{-1}$/260° C. | 138 | 151 | 144 |
| 1000 s$^{-1}$/280° C. | 84 | 97 | 92 |
| MVR (240° C./5 kg) [cm$^3$/10 min] | 24.9 | 22.0 | 20.9 |
| Tensile modulus of elasticity [N/mm] | 2996 | 2920 | 3300 |
| Elongation at break [%] | 15.5 | 13.8 | 11.8 |
| Scratch resistance | | | |
| Acc. to ASTM D-3363 | H | H | F |
| Stress-cracking resistance (ESC behavior) | | | |
| 1) toluene/isopropanol 2.4% | w/o f$^{1)}$ 10 min | w/o f$^{1)}$ 10 min | RUP 8 min |
| 2) hydraulic oil 2.4% | RUP 64.5 h | RUP 7.9 h | RUP 7.5 h |
| 3) rapeseed oil 2.4% | RUP 13 min | RUP 2.5 min | RUP 2.5 min |
| Fire behavior (UL 94V)/ Total afterburning time | V0/29 s | V1/55 s | V0/34 s |

$^{1)}$without rupture after 10 min.

In the case of the flameproofed compositions of Table 2, only the composition according to the invention (Example 3) accomplishes the task according to the invention, i.e. with comparable scratch resistance (in comparison with Reference Example 4) an improved ESC behavior and an improved flowability are obtained. Reference Example 5 with talc as filler does not satisfy the criterion of high scratch resistance. Furthermore, Example 3 shows the best flammability (evaluation V0 with the shortest afterburning time (29 s) in comparison with Reference Examples 4 and 5).

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition consisting of
   A) 10-90 parts by weight of at least one member selected from the group consisting of aromatic polycarbonate and aromatic polyester carbonate,
   B) 0.5-30 parts by weight of rubber-modified graft polymer,
   C) 0.1-50 parts by weight of a plurality of hollow ceramic beads having a density of 2-3 g/cm$^3$ and a mean particle size from 0.5 to 100 μm,
   D) optionally phosphorous-containing flame proofing agent,
   E) optionally vinyl (co)polymer, and
   F) optionally at least one conventional functional additive selected from the group consisting of flame-retardant synergist, anti-dripping agent, lubricant, mold-release agent, nucleating agent, stabilizer, antistatic agent, conductive carbon black, carbon fibers, metal fibers, carbon nanotubes, dyestuffs and pigment.

2. The composition of claim 1, wherein the phosphorous-containing flame proofing agent is present in 1-18 parts by weight.

3. The composition of claim 1, wherein the vinyl(co)polymer is present in 1-30 parts by weight.

4. The composition of claim 1, wherein the conventional functional additive is present in 0.5-5 parts by weight.

5. The composition according to claim 1, wherein Al$_2$O$_3$ content of the hollow ceramic beads is 15 to 45 percent relative to their weight.

6. The composition according to claim 1, wherein the hollow ceramic beads exhibit compressive strengths of 50-700 MPa.

7. The composition according to claim 2, wherein said phosphorus-containing flameproofing agent conforms to formula (IV)

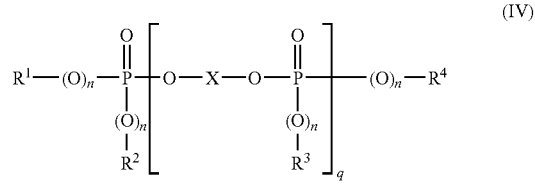

(IV)

wherein
R$^1$, R$^2$, R$^3$ and R$^4$ independently of one another denote C$_1$ to C$_8$ alkyl, C$_5$ to C$_6$ cycloalkyl, C$_6$ to C$_{20}$ aryl or C$_7$ to C$_{12}$ aralkyl, in each instance optionally substituted by alkyl, and/or halogen,
n denotes, independently of one another, 0 or 1,
q denotes 0 to 30 and
X denotes a mononuclear or polynuclear aromatic residue with 6 to 30 C atoms, or a linear or branched aliphatic residue with 2 to 30 C atoms.

8. The composition according to claim 7, wherein said X is the residue of bisphenol A.

9. A molded article comprising the composition according to claim 1.

* * * * *